(12) United States Patent
Tan et al.

(10) Patent No.: US 8,767,301 B2
(45) Date of Patent: Jul. 1, 2014

(54) MEMS-BASED PELLICLE BEAMSPLITTER

(75) Inventors: Michael Renne Ty Tan, Menlo Park, CA (US); Shih-Yuan (SY) Wang, Palo Alto, CA (US); Wei Wu, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 735 days.

(21) Appl. No.: 12/864,214

(22) PCT Filed: Jan. 31, 2008

(86) PCT No.: PCT/US2008/052718
§ 371 (c)(1),
(2), (4) Date: Jul. 22, 2010

(87) PCT Pub. No.: WO2009/096983
PCT Pub. Date: Aug. 6, 2009

(65) Prior Publication Data
US 2010/0296165 A1    Nov. 25, 2010

(51) Int. Cl.
*G02B 1/10* (2006.01)
*G02B 27/14* (2006.01)

(52) U.S. Cl.
CPC .................... *G02B 27/142* (2013.01)
USPC ............................ 359/583; 359/584; 359/586

(58) Field of Classification Search
USPC ......................... 359/580, 583–589, 629–640
See application file for complete search history.

(56) References Cited

U.S. PATENT DOCUMENTS

| | | |
|---|---|---|
| 5,073,018 A | 12/1991 | Kino et al. |
| 5,699,187 A * | 12/1997 | Fukushima et al. .......... 359/583 |
| 5,717,523 A | 2/1998 | Ohashi |
| 5,793,836 A | 8/1998 | Maldonado et al. |
| 6,180,292 B1 | 1/2001 | Acosta et al. |
| 6,197,454 B1 | 3/2001 | Yan |
| 6,525,884 B2 | 2/2003 | Kraiczek et al. |

(Continued)

FOREIGN PATENT DOCUMENTS

| | | |
|---|---|---|
| CN | 2209339 Y | 10/1995 |
| CN | 1156832 A | 8/1997 |

(Continued)

OTHER PUBLICATIONS

R.C. Cammarata, T.M. Trimble and D.J. Srolovitz, Surface stress model for intrisic stress in thin films; Nov. 2000; J. Mater. Res. vol. 15 No. 11, 2468-2474.*

(Continued)

*Primary Examiner* — Ricky Mack
*Assistant Examiner* — Robert E Tallman

(57) ABSTRACT

A method of forming a non-polarizing pellicle beamsplitter having a desired power-tap ratio. The method includes the operation of forming a base layer having a base refractive index on a substrate and arranging a plurality of alternating layers having relatively high and low indexes of refraction respectively over the base layer. The thickness of each of the high index and low index layers is selected to substantially eliminate polarization of the optical beam. The method further includes the operation of removing a selected area of the substrate to create an optical pathway comprised of both the base layer and the plurality of alternating layers, and where the optical pathway is configured to transmit and reflect a selected amount of light in the optical beam.

24 Claims, 8 Drawing Sheets

(56) References Cited

U.S. PATENT DOCUMENTS

| | | |
|---|---|---|
| 6,544,693 B2 | 4/2003 | Levinson et al. |
| 6,811,936 B2 | 11/2004 | Smith et al. |
| 6,859,330 B2 | 2/2005 | Kozlovsky et al. |
| 6,967,776 B2 | 11/2005 | Muraguchi |
| 6,972,907 B2 | 12/2005 | Kozlovsky et al. |
| 7,295,385 B2 | 11/2007 | Cianciotto |
| 2004/0246591 A1 | 12/2004 | Kozlovsky et al. |
| 2005/0053777 A1 | 3/2005 | Hilliard |
| 2007/0081255 A1 | 4/2007 | Cianciotto et al. |
| 2007/0086092 A1* | 4/2007 | Jidai et al. .................... 359/583 |

FOREIGN PATENT DOCUMENTS

| | | |
|---|---|---|
| JP | 02-071198 | 3/1990 |
| JP | 02-281202 | 11/1990 |
| JP | 02-306202 | 12/1990 |
| JP | 2002071946 | 3/2002 |
| JP | 2008-017104 | 1/2008 |

OTHER PUBLICATIONS

F. Spaepen Interfaces and Stresses in thin films, 2000, Acta Mater 48, 31-42.*

N.A.Paraire, P.G.Filloux, and K Wang; Patterning and characterizing of 2D photonic crystals fabricated by focused ion beam etching of multilayer membranes; Dec. 19, 2003; Institute of Physics; Nanotechnology vol. 15, pp. 341-346.*

Ivan Moreno, et al., "Thin-film spatial filters", Optics Letters, vol. 30, No. 8, Apr. 15, 2005, pp. 914-916.

K. Gupta, et al. 'Micromachined polarization beam splitters for the visible spectrum.' In: 2003 IEEEILEOS International Conference on Optical MEMS. Hawaii: LEOS, Aug. 18-21, 2003, pp. 171-172, Figure 1.

* cited by examiner

MEMS-BASED PELLICLE BEAMSPLITTER

BACKGROUND OF THE INVENTION

As computer chip speeds on circuit boards increase to ever faster speeds, a communications bottleneck in inter-chip communication is becoming a larger problem. One likely solution is to use fiber optics to interconnect high speed computer chips. However, most circuit boards involve many layers and often require tolerances in their manufacture of less than a micron. Physically placing fiber optics and connecting the fibers to the chips can be too inaccurate and time consuming to be widely adopted in circuit board manufacturing processes.

Routing the optical signals around and between circuit boards can add significant additional complexity. Marketable optical interconnects between chips have therefore proven elusive, despite the need for broadband data transfer.

BRIEF DESCRIPTION OF THE DRAWINGS

Features and advantages of the present invention will be apparent from the detailed description that follows, and when taken in conjunction with the accompanying drawings together illustrate, by way of example, features of the invention. It will be readily appreciated that these drawings merely depict exemplary embodiments of the present invention and are not to be considered limiting of its scope, and that the components of the invention, as generally described and illustrated in the figures herein, could be arranged and designed in a wide variety of different configurations. Nonetheless, the present invention will be described and explained with additional specificity and detail through the use of the accompanying drawings, in which.

DETAILED DESCRIPTION OF EXEMPLARY EMBODIMENTS

Figure 1:
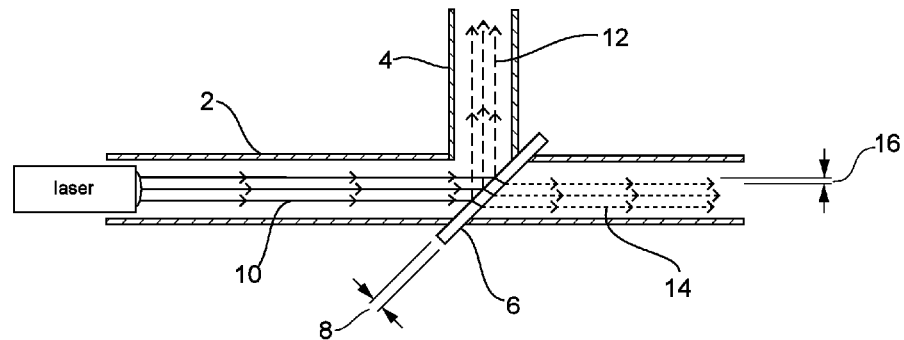
FIG. 1 is an illustration of the operation of a conventional beamsplitter in common optical waveguide applications.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. As such, the following more detailed description of the embodiments of the present invention is not intended to limit the scope of the invention as it is claimed, but is only presented for purposes of illustration: to describe the features and characteristics of the present invention; to set forth the best mode of operation of the invention; and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

One method for constructing optical interconnects between computer chips on a circuit board is to use optical waveguides formed on the circuit board. Optical waveguides can be superior to glass-based fibers optics for inter-connecting electronics because of the ability to form the waveguides on the circuit board using lithographic or similar processes. The waveguides used in these interconnection systems are typically formed on the circuit boards with substantially optically transparent materials, such as polymers and/or dielectrics. Optical waveguides made using lithographic or similar manufacturing processes can also be formed on other types of substrates that are not mounted on a circuit board. For example, optical waveguides may be formed on a flexible substrate to create a ribbon cable having one or more optical waveguides.

Forming optical waveguides in this fashion can provide interconnects that are constructed with the necessary physical tolerances to be used on modern multi-layer circuit boards. However, the polymers, dielectrics, and other materials that can be used in chip and circuit board manufacture to form the on-board waveguides are typically significantly more lossy than glass-based fiber optics. Indeed, the amount of loss in on-board waveguides has been one of the factors limiting the acceptance of optical waveguide interconnects. Polymers used to construct the waveguides can have a loss of 0.1 dB per centimeter. In contrast, the loss in a glass fiber is around 0.1 dB per kilometer. Thus, solid core polymer waveguides can have losses that are orders of magnitude greater than the loss in glass-based fiber optics.

In addition, solid core waveguides are usually manufactured to have dimensions that are roughly proportional with the wavelength of light they are designed to carry. For example, a single mode waveguide configured to carry 1000 nm light may have its largest dimension of to 0.5 μm (500 nm) to 8 μm, while multimode waveguides may have slightly larger dimensions, on the order of 20-60 μm for the core region. Nevertheless, because of their extremely small size, connecting any optical waveguides formed on a circuit board can be expensive and challenging, which has historically reduced their use in most common applications.

Another type of optical waveguide that exhibit low loss is the hollow core metal waveguide. It is a waveguide with an air core and highly reflective coatings on the surrounding walls. Typically, it can have a circular, rectangular or elliptical cross section with dimensions on the order of 50 to 1000 □m. These waveguides have a low loss on the order of <0.05 dB/cm. A collimating lens must be used to excite the low loss modes. These low loss modes have rays which travel at a near grazing incidence angle to the waveguide walls. The propagation loss of these modes depends on the number of bounces or reflections the rays experience as it propagates down the length of the waveguide.

The splitting and tapping of the guided optical beams using hollow core metal waveguides can be difficult to accomplish. For instance, one problem with integrating existing beamsplitter technology with small waveguides is illustrated in FIG. 1. Due to the ultra-small dimensions of the waveguide 2 and the optical tap 4, the diameter of the optical pathway inside the waveguide can be on the same order of magnitude as the thickness 8 of the beamsplitter 6. This lateral displacement 16, or beam walk-off, can be compounded if one adds multiple optical taps sequentially along the same optical waveguide and all the beamsplitters are orientated to redirect the beam of light in the same direction, as can found with a circuit board-mounted optical backplane optically connected to multiple daughter cards. Each optical tap can add additional displacement until the beam is outside the desired transmission area, causing significant loss due to coupling with the sides of the waveguide.

Another problem inherent in conventional beamsplitter technology is the natural tendency of beamsplitters to have different split ratio (reflectivity and transmissivity) for different polarization of the input beam. This is due to the fact that the Fresnel reflection coefficients for the in-plane P component and the orthogonal S component have different dependence on the incident angle. Thus, using low cost non-polarized multi-mode lasers such as VCSELs may lead to polarization induced intensity noise which depends on the polarization state of the laser under modulation. To compensate, either the power output of a non-polarized multi-mode laser must be doubled, or a single-mode laser producing a properly aligned, polarized, coherent beam of light must be used. Either alternative adds significantly to the overall cost of the optical system, which can employ multiple optical waveguides and many laser light sources.

Moreover, when using multiple optical taps 4 along a optical waveguide 2, it can be beneficial to control the power tap ratio of the beamsplitter 6, also known as the ratio between the incident energy and the transmitted energy of the optical device. For example, if each optical tap along the waveguide had the same power tap ratio, the reflected optical beams would have less and less intensity as one moves along the optical backplane, since the overall strength of the optical beam entering a subsequent tap has been proportionately decreased by the previous optical interconnect. With optical backplanes having multiple interconnect locations, it can be useful to select the power tap ratios of the various tap locations to balance the intensity of the reflected optical beams.

As a result of the above-identified deficiencies, it has been recognized that an inexpensive optical interconnect is needed that is both simpler to interconnect with other waveguides and optical devices, and which can significantly reduce the amount of loss in an optical waveguide. It has also been found that loss can be minimized by using beam splitters configured to enable multiple optical taps along the same pathway that produce minimal lateral displacement from the center of the optical waveguide, and provide a substantially non-polarizing path for the optical beam. It has been further recognized that the method of forming the optical interconnect can provide for precise control of the power tap ratio of the optical device.

The present invention describes a method and system for making a MEMS-based ("microelectromechanical") pellicle beamsplitter that allows for more than one optical tap along an optical waveguide. The method provides a low-cost, easy-to-manufacture pellicle beamsplitter that is both non-polarizing and can be configured with a specific power-tap ratio that is selected for each tap location along an optical waveguide. Furthermore, as the pellicle beamsplitter of the present invention is also non-polarizing, a low-cost multi-mode laser can be used to drive the optical system, rather than a more expensive single-mode laser. As the pellicle beamsplitter substantially reduces beam walk-off as compared to conventional systems, the resulting optical system is far less lossy, resulting in further reductions in cost by reducing the laser power requirements.

Figure 2:
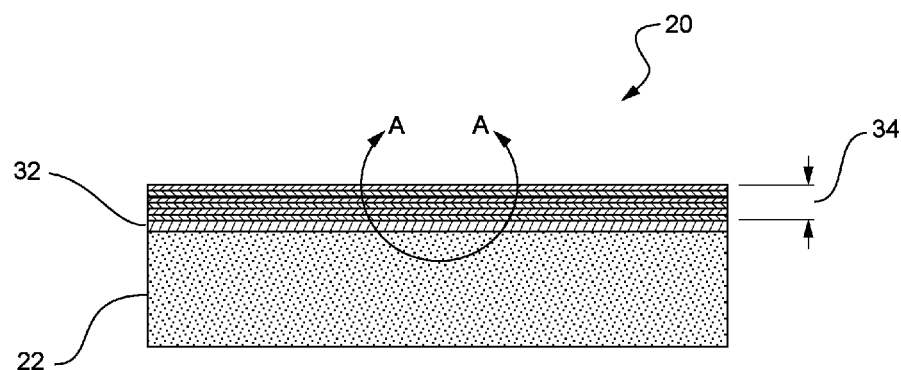
FIG. 2 illustrates a MEMS-based pellicle beamsplitter, in accordance with an exemplary embodiment of the present invention, after an intermediate step in the fabrication process.

With reference to FIG. 2, illustrated is an exemplary embodiment 20 of the present invention after having completed several steps in the fabrication process. At this point in the production process, a base layer 32 has been applied over a substrate 22, and subsequently a beamsplitter coating 34 has been applied over the base layer. The substrate can be comprised of one or more materials such as silicon or a polymer, as can be appreciated. The base layer 32 is formed from an optically transmissive material that has a refractive index number, which can be further defined as the base refractive index. The base layer can be formed with any thickness that can impart both the structural support and desired optical characteristics to the optical pathway of the completed beamsplitter. In an exemplary embodiment the thickness of the base layer can be approximately 250 nm, or 0.25 µm. However, the base layer can be formed with a thickness substantially greater than or less than 250 nm, so long as the index of the base layer material is known and the thickness of the base layer can be precisely controlled. The substrate 22 upon which the base layer is fabricated can have a thickness of about 200 µm, but can also can be formed with a thickness substantially greater than or less than 200 µm so long as it provides adequate structural support for the pellicle membrane and allows the beamsplitter to fit within the optical waveguide.

Figure 3:
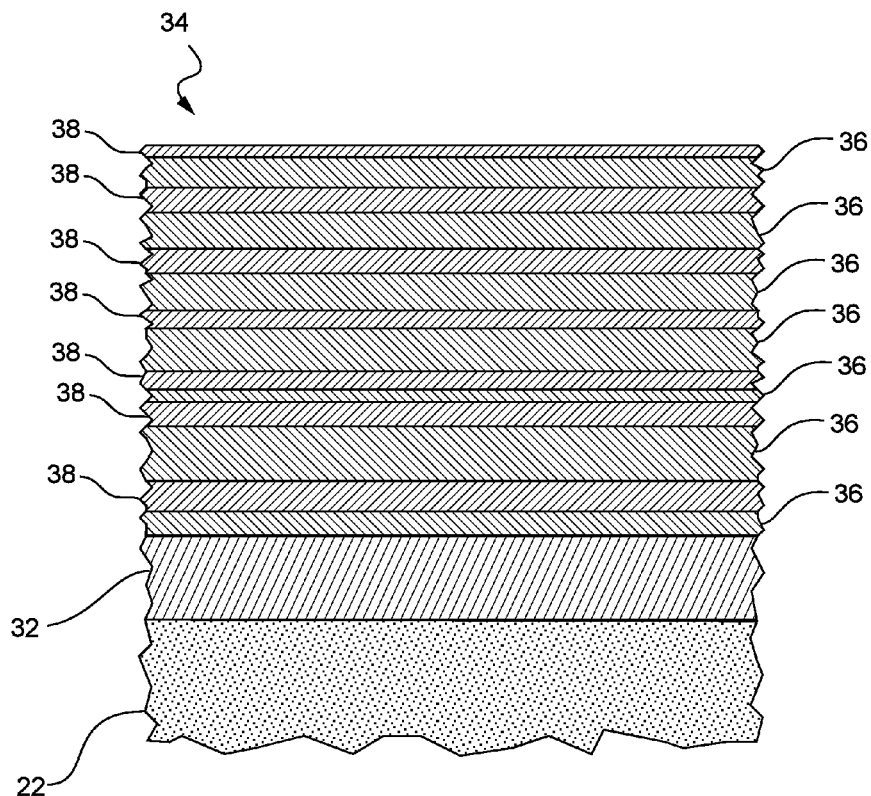
FIG. 3 is a partial view of the embodiment of FIG. 2, taken along section line A-A.

The beamsplitter coating 34 applied over base layer 32 is shown in more detail in FIG. 3, which is a close-up of Section A-A taken from the embodiment of FIG. 2. The beamsplitter coating can be comprised of a plurality of alternating layers having a low index of refraction 36 and a high index of refraction 38. The low index of refraction layers can have an index range $1.3<n<1.8$, and the high index of refraction layers can have an index range $1.8<n<3$.

Unlike previous optical membranes formed from a stack of alternating layers, however, the thickness of the alternating layers of the present invention are not uniform, and furthermore are not required to have a thickness which is equivalent to ¼ the wavelength of a selected wavelength of light. To the contrary, the alternating layers of low index and high index refraction materials can have thicknesses which may or may not be equal to a fraction of the wavelength of light, and each alternating layer can have a thickness that is substantially unequal to the thickness of any adjacent layer.

Through a process of experimentation and optimization, the alternating layers of low and high index of refraction materials are formed in a selected order and with particular thicknesses that, when taken together with the base layer, combine to form an optical pathway that is both non-polarizing and which has a specified reflectance. An example of two optical pathways having specified reflectance ratios of 11% and 42%, respectively, is shown in Table 1. This process of selection allows for significant variation. For instance, the number of alternating layers in the beamsplitter coating can vary substantially, for example, from 1 layer to 20 layers or more. Additionally, there is no prescribed order to the arrangement of high index and low index of refraction layers, as either material can be positioned next to the base layer 32. Either material can be the last layer formed on the top of the stack forming the beamsplitter coating. Moreover, the total number of alternating layers can be odd or even in number.

In the above example, two materials, SiO2 and TiO2, were used. Alternatively, three or more materials may be used to improve the thickness tolerance for each of the individual layers and also reduce the total thickness of the pellicle.

TABLE 1

Optical Pathways, Layers Material and Thickness

| | 11% Reflectance | | 42% Reflectance | |
|---|---|---|---|---|
| | Material | Thickness (nm) | Material | Thickness (nm) |
| Layer 15 | | | $SiO_2$ | 231.80 |
| Layer 14 | $TiO_2$ | 38.44 | $TiO_2$ | 25.98 |
| Layer 13 | $SiO_2$ | 101.93 | $SiO_2$ | 190.44 |
| Layer 12 | $TiO_2$ | 79.72 | $TiO_2$ | 82.23 |
| Layer 11 | $SiO_2$ | 135.81 | $SiO_2$ | 129.05 |
| Layer 10 | $TiO_2$ | 75.12 | $TiO_2$ | 65.45 |
| Layer 9 | $SiO_2$ | 121.84 | $SiO_2$ | 106.09 |
| Layer 8 | $TiO_2$ | 71.17 | $TiO_2$ | 62.00 |
| Layer 7 | $SiO_2$ | 151.35 | $SiO_2$ | 122.21 |
| Layer 6 | $TiO_2$ | 71.00 | $TiO_2$ | 80.12 |
| Layer 5 | $SiO_2$ | 51.06 | $SiO_2$ | 154.58 |
| Layer 4 | $TiO_2$ | 90.74 | $TiO_2$ | 92.43 |
| Layer 3 | $SiO_2$ | 190.49 | $SiO_2$ | 206.99 |
| Layer 2 | $TiO_2$ | 104.32 | $TiO_2$ | 37.37 |
| Layer 1 | $SiO_2$ | 76.14 | $SiO_2$ | 147.72 |
| Base Layer | $Si_3N_4$ | 249.98 | $Si_3N_4$ | 249.98 |

The high index of refraction layers 38 can be formed from a material with a relatively high index of refraction, such as an index of refraction greater than 1.8. The high index layers can be selected from the materials such as titanium dioxide, aluminum oxide, tantalum oxide, zinc selenide, etc.

The low index of refraction layers 36 can be formed from a material with a relatively low index of refraction, such as an index of refraction equal to or less than 1.8, and can be selected from materials such as silicon dioxide, silicon monoxide, hafnium oxide, magnesium fluoride, etc.

As can be appreciated, the base layer 32 can be formed from a material having either a high index of refraction or a low index of refraction, and which combines with the alternating layers of the beamsplitter coating to produce an optical pathway with the desired optical characteristics. For example, the base layer can be comprised of a dielectric material, such as silicon nitride or silicon dioxide, or even a substantially transparent polymer.

The base layer 32 and the plurality of alternating layers having high and low indexes of refraction, or beamsplitter coating 34, can be formed over the substrate 22 using a lithographic or similar manufacturing process. The base layer and beamsplitter coating can be formed in a state of horizontal tension, such that a net preload force is imparted within the layered structure which pulls the center of the pellicle membrane towards the periphery. Preloading the pellicle membrane in a state of tension can be advantageous. The state of horizontal tension can act to directly counter any extrinsically-applied compression or sheer forces which might bow or warp the membrane out of an optically flat shape. The tensile preload can also act to prevent rippling in the individual layers.

Figure 4:
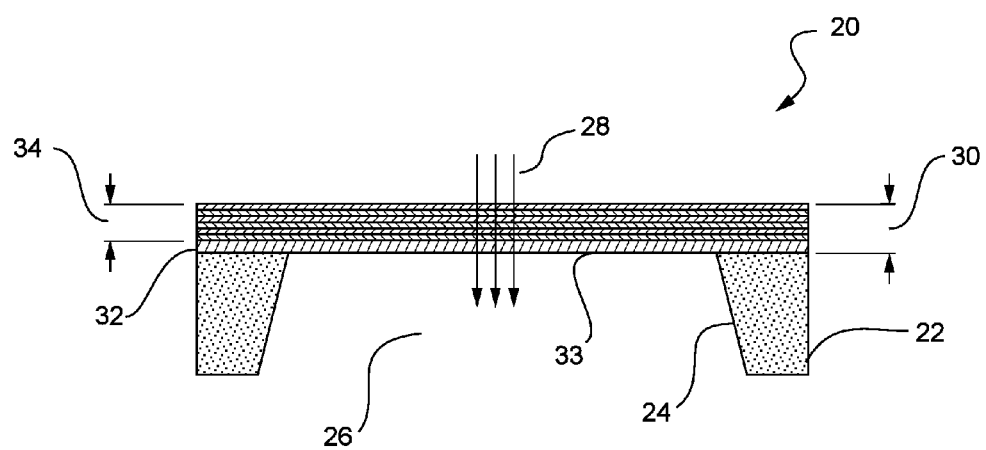
FIG. 4 is an illustration of a MEMS-based pellicle beamsplitter in accordance with an exemplary embodiment of the present invention.

FIG. 4 illustrates a MEMS-based pellicle beamsplitter in accordance with the exemplary embodiment 20 of the present invention. The center section of the silicon substrate 22 has been etched away using conventional lithographic or similar processes to form a cavity 26 that exposes the bottom surface 33 of the base layer 32. Etching the center section to expose the base layer results in a pellicle beamsplitter having a pellicle membrane 30 comprising a beamsplitter coating 34 layered over a base layer 32, and which is supported by a substrate frame 24 around the perimeter. The cavity 26 in the underside of the device allows an optical pathway 28 through the center region of the beamsplitter.

The base layer 32 underlying the beamsplitter coating 34 is selected to have a desired index of refraction and is configured to provide structural support as well as form a portion of the optical pathway 28 of the device. The combination of the base layer and the beamsplitter coating provides a significant advantage. With a thickness of around 250 nm (0.250 µm), the base layer is sufficiently thin that it is designed as part of the beamsplitter coating, obviating the need to apply an anti-reflection ("AR") coating to the bottom surface 33 of the base layer to reduce 'ghosting', which is a common problem with conventional beamsplitters. The absence of an AR coating is advantageous in that it both saves a step in the manufacturing process, and allows the optical beam to pass through the pellicle membrane 30 in either direction. Thus, while the illustration in FIG. 4 indicates light passing through the optical pathway 28 from front (top) to back (bottom), the structure of the present invention allows light to travel in the reverse direction as well, from back (bottom) to front (top).

It should be noted that while the thicknesses of the individual layers forming the pellicle membrane 30 and the supporting substrate frame 24 can vary significantly, in one exemplary embodiment the substrate frame 24 can retain the original thickness of the silicon substrate 22 of about 200 µm, and the thickness of the pellicle membrane 30 can vary from about 300 nm (0.3 µm) to about 5000 nm (5.0 µm), with a typical value of about 2000 nm (2.0 µm), depending on the number and thickness of the dielectric layers in the beamsplitter coating 34.

Figure 5:
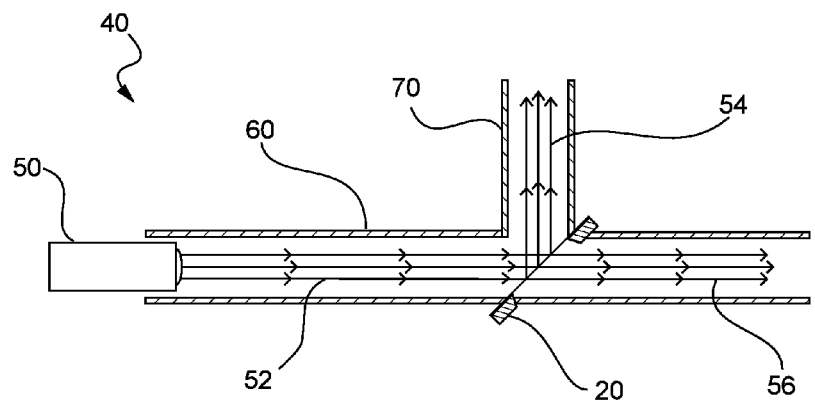
FIG. 5 is an illustration of the application of the embodiment of FIG. 4 used with an optical waveguide with a single optical interconnect.

An application 40 of the embodiment 20 of the pellicle beamsplitter into an optical waveguide with a single optical interconnect is shown in FIG. 5. A source 50 for an optical beam, such as a laser or LED, is situated at one end of the optical waveguide 60. The light source produces an incident light beam 52 which travels down the interior of the waveguide until contacting the pellicle beamsplitter 20, at which point a predetermined portion of the light is reflected into the optical interconnect 70 as the reflected optical beam 54, and a portion of the light is transmitted through the beamsplitter as the transmitted optical beam 56. The ratio of the reflected light energy over the incident light energy is known as the reflectance of the beamsplitter, and the ratio of the transmitted light energy over the incident light energy is known as the transmittance of the beamsplitter. The transmittance is also known as the power tap ratio.

One advantage of the present invention is that, through the proper selection and combination of the alternating layers of high index and low index of reflectivity materials with the base layer having its own index value, the power tap ratio of the pellicle beamsplitter can be precisely controlled to within 1%. This aspect of the present invention is illustrated by the graphs presented in FIGS. 7 and 8, in which the reflectance ratio of the pellicle beamsplitter is set at 11% and 42%, respectively. Moreover, with proper selection the non-polarizing pellicle beamsplitter can be constructed with sufficient alternating layers along the optical pathway to reflect anywhere from 1% to 99% of the power in the optical beam.

Figure 7:
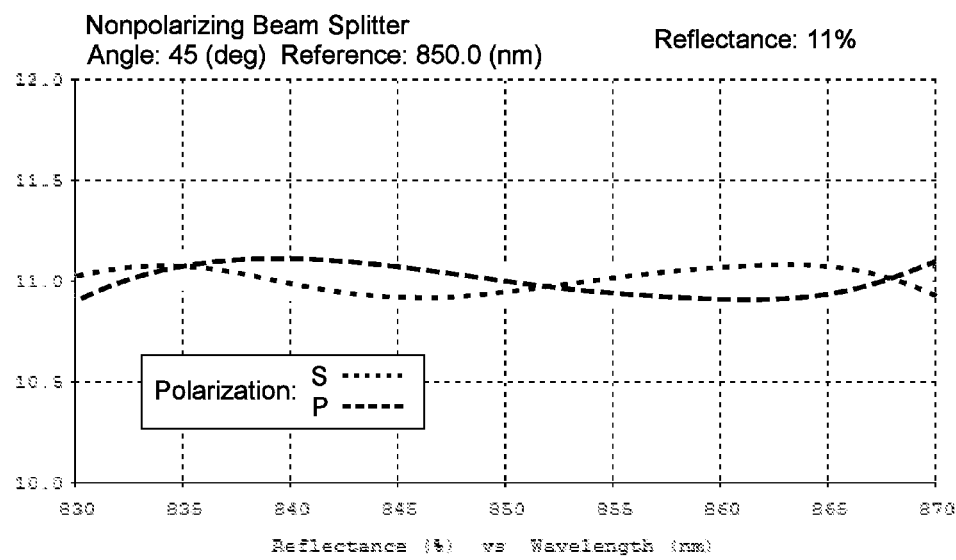
FIG. 7 is a graph illustrating the nonpolarization capability of a MEMS based pellicle beam splitter in accordance with an embodiment of the present invention.
Figure 8:
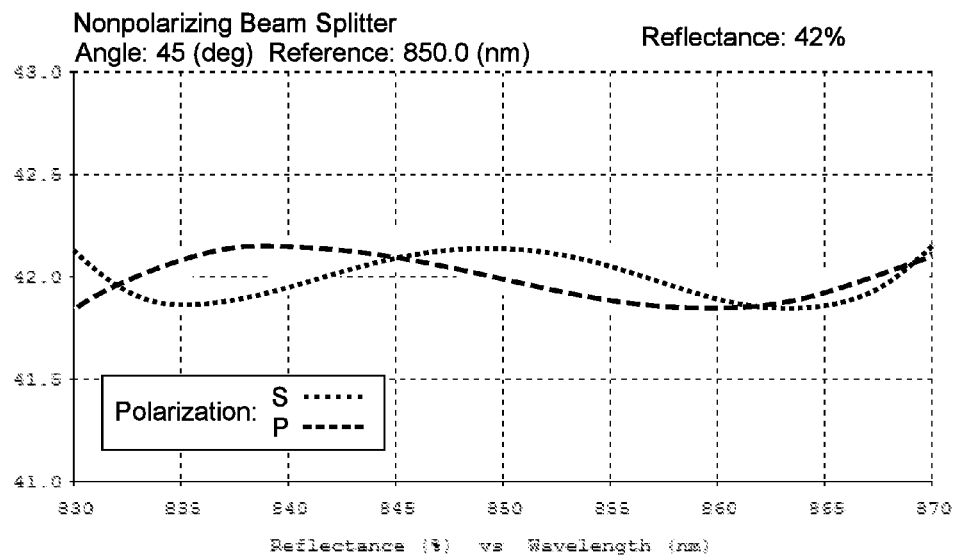
FIG. 8 is a graph illustrating the nonpolarization capability of a MEMS based pellicle beam splitter in accordance with an embodiment of the present invention.

Also shown in FIGS. 7 and 8 is the aspect of the present invention that neither the reflected optical beam 54 nor the transmitted optical beam 56 from the pellicle beamsplitter 20 is substantially dependent on the polarization state of the incident beam.

In FIG. 7, for instance, an exemplary embodiment of the present invention having a reflectance ratio of 11% results in differences in reflected values between the P-component and the S-component of less than 1% across the wavelength band from 830 nm to 870 nm. As similarly shown in FIG. 8, an exemplary embodiment of the present invention having an overall reflectance ratio of 42% also yields differences in reflected values between the P-component and the S-component of less than 1% across the wavelength band from 830 nm to 870 nm. The capability to both reflect and transmit nonpolarized light is beneficial for the optical waveguide system, as all the energy contained in the incident optical beam 52 is available for either reflectance down the optical interconnect or transmittance further along the waveguide. This allows for a more complete and efficient utilization of the output from light source 50, with a corresponding decrease in power requirements. It also relaxes the requirement of a polarized light source.

Figure 6:
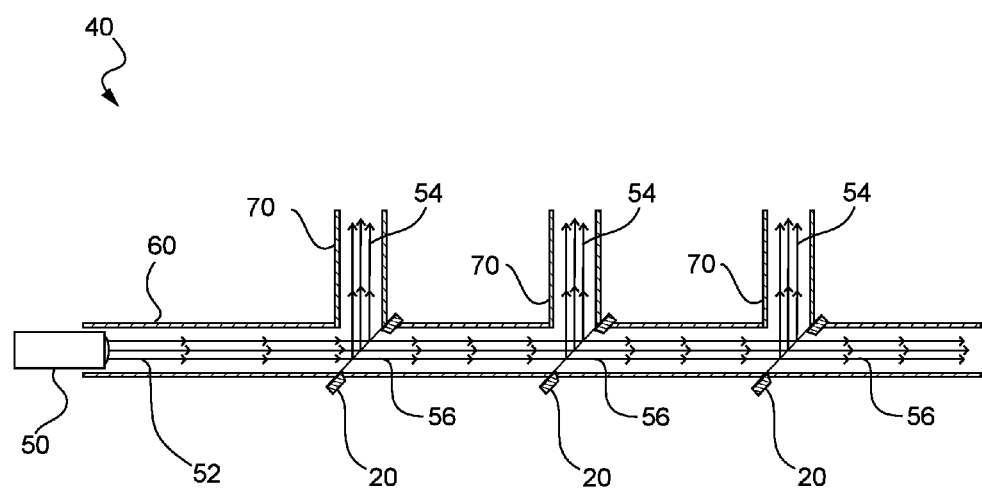
FIG. 6 is an illustration of the application of the embodiment of FIG. 4 used with an optical waveguide with multiple optical interconnects.

FIG. 6 is an illustration of the application 40 of the embodiment 20 of the MEMS-based pellicle beamsplitter into an optical waveguide 60 with multiple optical interconnects 70. Each pellicle beamsplitter 20 positioned in the optical waveguide can be formed with a similar power tap ratio, in which case the reflected optical beams 54 will contain less and less energy the further away the interconnect is located from the light source 50. Or in the alternative, each pellicle beamsplitter can be formed with a predetermined power tap ratio, selected to enable a desired amount of optical energy to be diverted into each optical interconnect 70 in each of the respective reflected optical beams 54. This capability provides the distinct advantage of enabling more flexibility in designing the optical system, such as apportioning a desired amount of optical energy to a particular daughter card located some distance down an optical backplane.

Also illustrated in FIG. 6 is the limited amount of lateral displacement of the optical beam, or "walk-off" caused by the pellicle beamsplitter 20 of the present invention. The extremely thin 2 μm membrane of each pellicle beamsplitter results in negligible displacement of the optical beam as it travels down the optical waveguide. Even after passing through multiple optical interconnects, each transmitted optical beam 56 remains substantially aligned with the original incident optical beam 52. Because there is limited lateral relocation of the transmitted optical beam closer to a wall or side surface boundary of the waveguide, as can occur with conventional beamsplitters, reflection losses are minimized, which results in an additional decrease in the power requirements on the light source 50.

Figure 9:
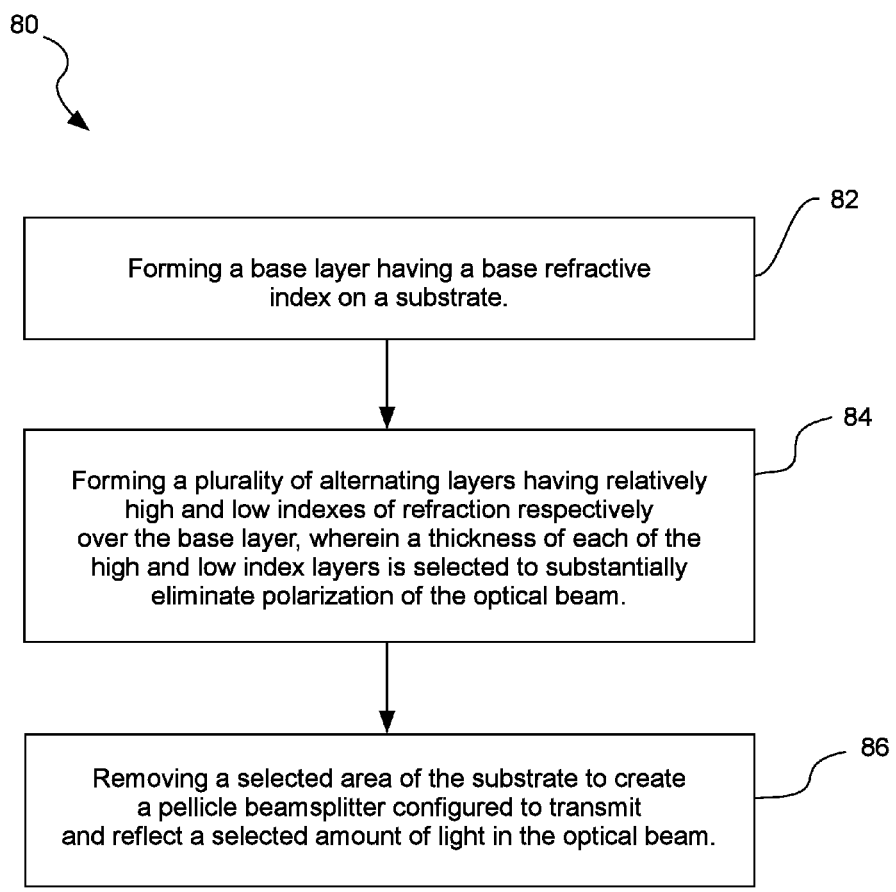
FIG. 9 is a flow chart depicting a method for making a MEMS-based pellicle beamsplitter in accordance with an embodiment of the present invention.

As illustrated in the flow chart of FIG. 9, another embodiment provides a method 80 of forming a non-polarizing pellicle beamsplitter having a desired power-tap ratio to provide multiple optical interconnects along an optical beam. The method includes the operation of forming 82 a base layer having a base refractive index on a substrate. The base layer can be comprised of a dielectric material such as silicon nitride or silicon dioxide, and can have a thickness of approximately 250 nm. A polymer base material such as Mylar can also be used.

The method 80 further includes the operation of forming 84 a plurality of alternating layers having relatively high and low indexes of refraction respectively over the base layer, such that the thickness of each of the high index and low index layers is selected to substantially eliminate the polarization sensitivity of the optical beam. Furthermore, the thickness of each of the high index and low index layers can be unequal to the thickness of any immediately adjacent layer.

The low refraction index layers can have a refractive index number greater than 1.3 and less than or equal to 1.8. Potential candidates can be silicon dioxide, silicon monoxide, hafnium oxide and magnesium fluoride. The high refraction index layers can have a refractive index number ranging from 1.8 to 3.0. For example, potential materials can be titanium dioxide, aluminum oxide, tantalum oxide and zinc selenide, etc.

Finally, the method 80 also includes removing 86 a selected area of the substrate to create a pellicle beam splitter having an optical pathway comprising the base layer and the plurality of alternating layers, such that the optical pathway is configured to transmit and reflect a selected amount of light in the incident optical beam.

Figure 10B:
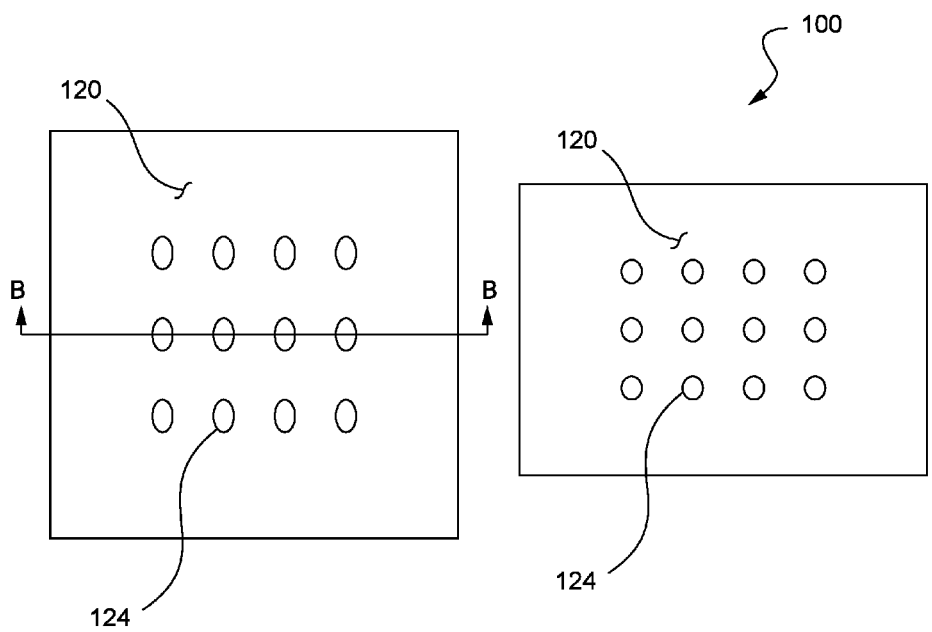
FIG. 10 is an illustration of a MEMS-based pellicle beamsplitter in accordance with an exemplary embodiment of the present invention.
Figure 10B:
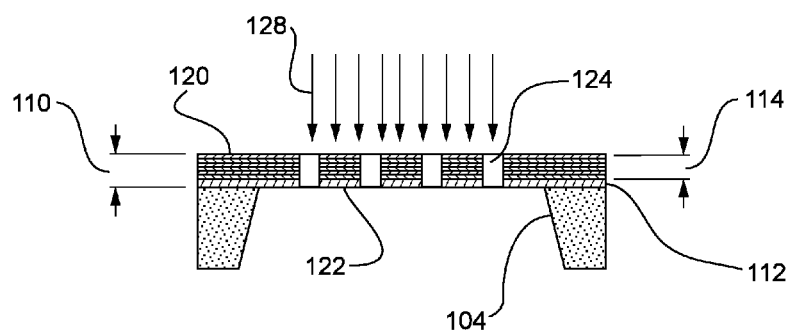

In another exemplary embodiment 100 of the present invention, one or more through-holes 124 or apertures can be formed in the pellicle membrane 110, as shown in FIGS. 10a-b. FIG. 10b, which is a partial view of the beamsplitter of FIG. 10a as viewed from section line B-B, shows that the through-holes can provide a continuous opening from the front surface 120 of the beamsplitter coating 114 to the back surface 122 of the base layer 112, which allows a portion of the incident light 128 striking the front (or back) surface of the membrane 110 to pass directly through the through-holes without contacting a physical surface. Furthermore, the plurality of layers having high and low indexes of refraction forming the beamsplitter coating 114 can be formed with sufficient reflectivity that substantially all light contacting the beamsplitter coating is reflected. As such, the pellicle membrane 110 of embodiment 100 reflects substantially all light that does not pass through the one or more through-holes 124. Alternatively, instead of the multilayer coating, a single metal layer such as silver can be used as the high reflectance coating. This has the advantage of further reducing manufacturing complexity of the pellicle beam splitters.

Since the portion of the optical beam that passes through the through-holes 124 travels in free space, no beam walk-off or polarization affects transpire within the small apertures. Furthermore, the degree of reflectivity vs. transmissivity can be precisely controlled by controlling the size and number of the through-holes. And as shown in FIG. 10a, the through-holes can be given an oblong or elliptical shape, with the long axis of the hole being aligned with the incident optical beam, so that when the pellicle beamsplitter is placed at an angle inside the waveguide, the oblong holes assume the shape of a circle when viewed from the perspective of the light source. This is further advantageous because giving the one or more through-holes a circular aspect, when viewed from the perspective of the light source, simplifies the equations used to calculate the reflectivity and transmissivity of the pellicle beamsplitter, and also allows for better control of shape and location of the transmitted optical beam.

Figure 11B:
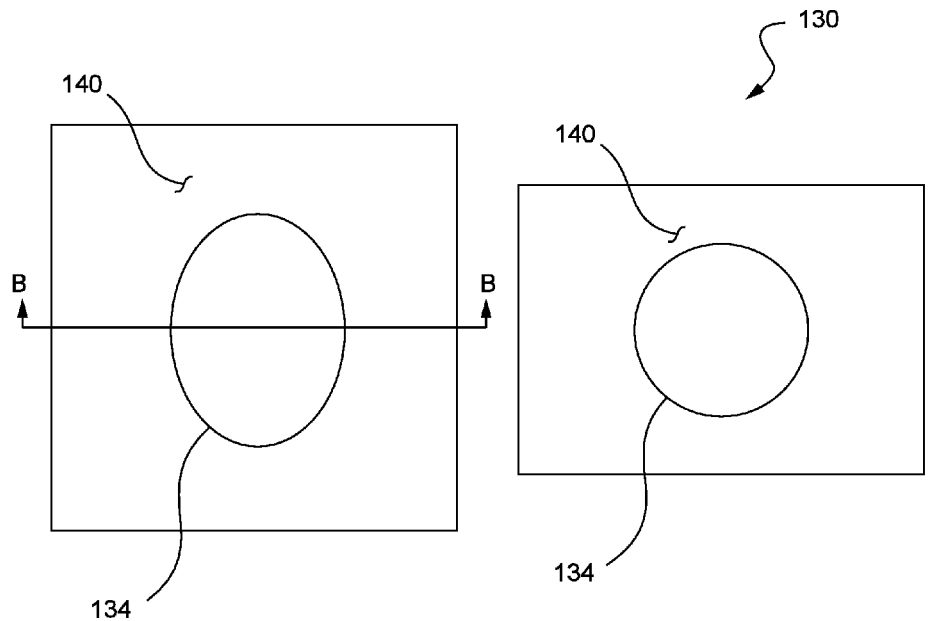
FIG. 11 is an illustration of a MEMS-based pellicle beamsplitter in accordance with another exemplary embodiment of the present invention.
Figure 11B:
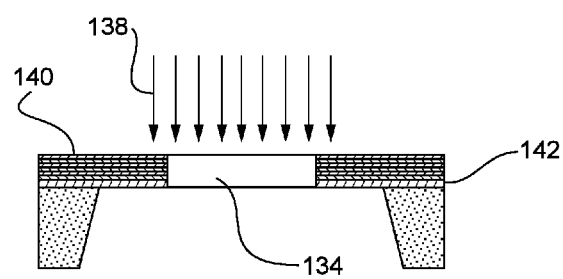

In an alternative to the embodiment shown in FIGS. 10a-10c having multiple through-holes, a pellicle beamsplitter 130 with a single aperture 134 formed through the beamsplitter coating 140 and the base layer 142 may be deployed as illustrated in FIGS. 11a-11c. The aperture can be formed with elliptical profile that assumes the shape of a circle when placed at an angle inside the waveguide, as viewed from the perspective of the light source. The amount of light 138 transmitted will be approximately equal to the ratio of the circular aspect area of the aperture relative to the total internal cross sectional area of the waveguide. In this way, the perturbation to the waveguide mode can be minimized.

Figure 12A:
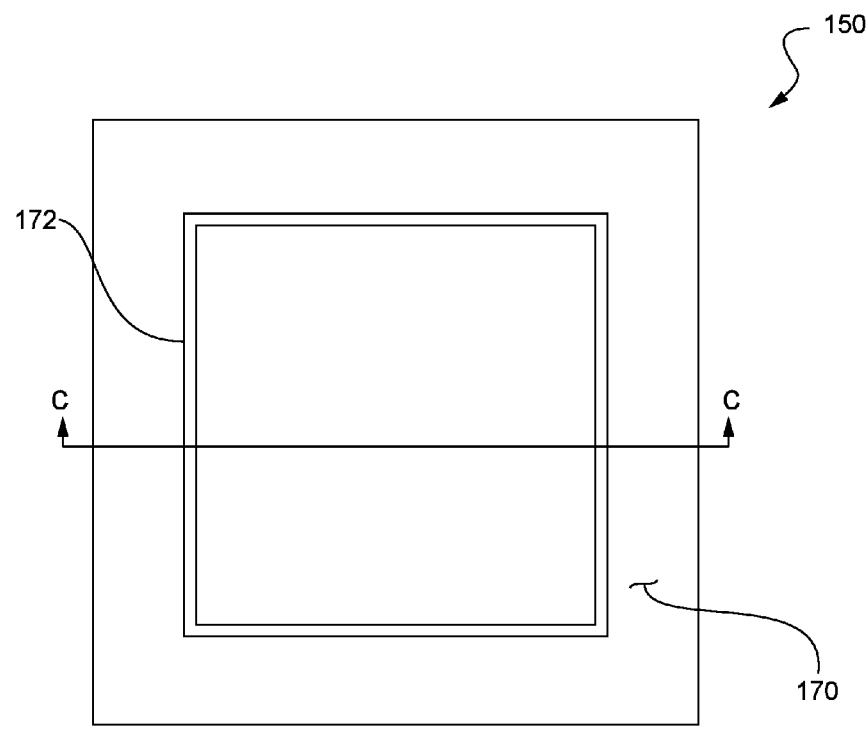
FIG. 12 illustrates a MEMS-based pellicle beamsplitter in accordance with yet another exemplary embodiment of the present invention.
Figure 12B:
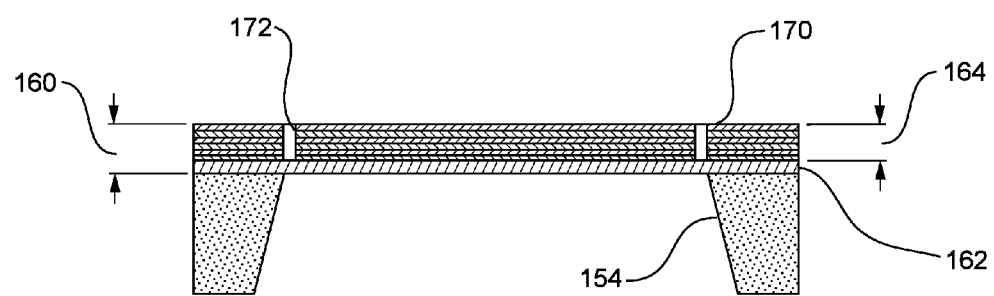

In another embodiment 150, as illustrated in FIGS. 12a-b, a slot 172 can be formed in the beamsplitter coating 164 to reduce any residual stresses in the coating which may cause it to bow or ripple or otherwise deform in a manner that may affect the optical pathway. The slot may extend from the top surface of the pellicle membrane 160 all the way through the beamsplitter coating until reaching the base layer 162, but would not extend through the base layer. Furthermore, the slot may completely encircle a center region of the pellicle membrane, as shown, or may extend only partway around an exterior portion of the membrane, or may be broken up into multiple separate and discrete slots located as needed around the center region of the membrane. Moreover, the slot can assume any shape, such as a square, rectangle or circle, and can also be formed using any lithographic or similar manufacturing technique.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims.

What is claimed is:

1. A method of forming a non-polarizing pellicle beamsplitter having a desired power-tap ratio to provide multiple taps along an optical beam, comprising:
    forming a base layer having a base refractive index on a substrate;
    forming a plurality of alternating layers having relatively high and low indexes of refraction respectively over the base layer, wherein a thickness of each of the high index layers and low index layers is selected to substantially eliminate polarization sensitivity to the optical beam;
    removing a selected area of the substrate to create an optical pathway comprising the base layer and the plurality of alternating layers, wherein the optical pathway is configured to transmit and reflect a selected amount of light in the optical beam; and
    forming at least one through-hole having a predetermined size in the optical pathway to allow a portion of the optical beam to be transmitted through the at least one through-hole.

2. The method of claim 1, further comprising forming the plurality of alternating layers having relatively high and low indexes of refraction, wherein a thickness of at least one high index layer or low index layer is unequal to a thickness of an adjacent layer.

3. The method of claim 1, further comprising forming the base layer wherein the base layer is comprised of a dielectric material.

4. The method of claim 3, further comprising forming the base layer of the dielectric material that is selected from the group consisting of silicon nitride, silicon dioxide and a transparent polymer.

5. The method of claim 3, further comprising forming the base layer having a thickness that is equal to or less than 250 nm.

6. The method of claim 1, further comprising selecting a material for the high index layers having a refractive index greater than 1.8 and less than 3.0.

7. The method of claim 1, further comprising selecting a material for the low index layers having a refractive index greater than 1.3 and less than or equal to 1.8.

8. The method of claim 1, wherein forming the plurality of alternating layers further comprises constructing the non-polarizing pellicle beamsplitter with sufficient alternating layers along the optical pathway to reflect from 1 percent to 99 percent of the power in the optical beam.

9. The method of claim 1, further comprising forming sufficient alternating layers that the optical pathway reflects light that is not allowed through the at least one through-hole.

10. The method of claim 1, further comprising forming a single layer over the base layer, wherein the single layer further comprises a high reflectance metal layer to reflect light that is not allowed through the at least one through-hole.

11. The method of claim 1, further comprising etching the at least one through-hole having an elliptical cross-section so as to appear circular to an optical beam impacting the optical pathway at an angle.

12. The method of claim 1, further comprising removing the selected area of the substrate by etching away the selected area to expose a bottom surface of the base layer.

13. The method of claim 1, further comprising etching a slot in the plurality of alternating layers and around a perimeter of the optical pathway so as to relieve residual stress in the plurality of alternating layers in the optical pathway.

14. The method of claim 13, further comprising etching the slot through the alternating layers to a top surface of the base layer.

15. The method of claim 1, further comprising forming the optical pathway in a state of planar tension to reduce bowing and rippling of the optical pathway.

16. A non-polarizing pellicle beamsplitter having a desired power-tap ratio for providing multiple taps along an optical beam comprising:
    a base layer having a base index of refraction physically coupled to a silicon substrate, the silicon substrate further comprising; an outer frame portion surrounding a center portion;
    a beamsplitter coating disposed on the base layer, the beamsplitter coating further comprising a plurality of alternating layers having relatively high and low indexes of refraction respectively, and wherein a thickness of each of the alternating layers is selected to substantially eliminate polarization sensitivity to the optical beam;

wherein the base layer over the center portion and the beamsplitter coating together comprise an optical pathway, and wherein the optical pathway is configured to transmit and reflect a selected amount of light in the optical beam; and a slot formed in the plurality of alternating layers, wherein the slot forms a perimeter around the optical pathway to relieve residual stress in the plurality of alternating layers.

17. The pellicle beamsplitter of claim 16, wherein the thickness of each of the alternating layers is unequal to a thickness of an adjacent layer.

18. The pellicle beamsplitter of claim 16, wherein the base layer is selected from the group consisting of silicon nitride, silicon dioxide and a transparent polymer.

19. The pellicle beamsplitter of claim 16, further comprising selecting a material for the high index layers having a refractive index greater than 1.8 and less than 3.0.

20. The pellicle beamsplitter of claim 16, further comprising selecting a material for the low index layers having a refractive index greater than 1.3 and less than or equal to 1.8.

21. The pellicle beamsplitter of claim 16, further comprising at least one through-hole formed in the optical pathway to allow a portion of the optical beam to be transmitted through the at least one through-hole.

22. The pellicle beamsplitter of claim 21, wherein the optical pathway includes sufficient alternating layers to reflect light that is not allowed through the at least one through-hole.

23. The pellicle beamsplitter of claim 16, wherein the optical pathway is formed in a state of planar tension to reduce bowing and rippling of the optical pathway.

24. A method of forming a non-polarizing pellicle beamsplitter having a desired power-tap ratio to provide multiple taps along an optical beam, comprising:

forming a base layer having a base refractive index on a substrate;

forming a plurality of alternating layers having relatively high and low indexes of refraction respectively over the base layer, wherein a thickness of each of the high index layers and low index layers is selected to collectively minimize polarization sensitivity to the optical beam;

removing a selected area of the substrate to create an optical pathway comprising the base layer and the plurality of alternating layers, wherein the optical pathway is configured to transmit and reflect a selected amount of light in the optical beam; and forming the any of the base layer and the alternating layers in a state of planar tension to reduce bowing and rippling of the optical pathway.

* * * * *